United States Patent [19]
Zerangue et al.

[11] Patent Number: 6,014,433
[45] Date of Patent: Jan. 11, 2000

[54] DYNAMIC ESCROW TYPE DETECTION SYSTEM

[75] Inventors: Frank R. Zerangue, Dallas; Robert Michael Rice, Carrollton, both of Tex.

[73] Assignee: Intellicall, Inc., Carrollton, Tex.

[21] Appl. No.: 08/980,984

[22] Filed: Oct. 7, 1997

[51] Int. Cl.⁷ .................................................. H04M 17/00
[52] U.S. Cl. ........................ 379/146; 379/150; 379/155
[58] Field of Search ..................................... 379/143, 144, 379/146–150, 151–152, 153–155, 132, 133–134, 112–114, 111; 194/302, 307, 314, 316, 317–319, 206, 207

[56] References Cited

U.S. PATENT DOCUMENTS

| | | | |
|---|---|---|---|
| 3,842,210 | 10/1974 | Dawson | 379/150 |
| 4,759,054 | 7/1988 | Mellon . | |
| 4,768,227 | 8/1988 | Dively et al. | 379/112 |
| 4,803,719 | 2/1989 | Ulrich . | |
| 4,860,346 | 8/1989 | Mellon . | |
| 5,027,935 | 7/1991 | Berg et al. . | |
| 5,133,005 | 7/1992 | Kelley et al. | 379/146 |
| 5,311,582 | 5/1994 | Davenport et al. . | |

*Primary Examiner*—Curtis A. Kuntz
*Assistant Examiner*—Duc Nguyen
*Attorney, Agent, or Firm*—Baker & Botts, L.L.P.

[57] ABSTRACT

An escrow unit is an electromechanical device used to collect or return coins deposited in a pay telephone. An escrow management system 10 for use in controlling a pay telephone escrow unit 26 is provided which consists of an energy storage unit 20 which stores a voltage for use in activating escrow unit 26 upon control unit 40 closing discharge switch 30. The system also contains a detector 42 to determine the voltage requirement of escrow unit 26 by sensing characteristics of escrow unit 26 related to the impedance of the escrow unit. The system also contains a control unit 40 which controls energy storage unit 20 and detector 42 such that escrow management system 10 can both dynamically determine the voltage required to activate escrow unit 26 and supply the correct voltage for activation of escrow unit 26.

23 Claims, 1 Drawing Sheet

DYNAMIC ESCROW TYPE DETECTION SYSTEM

TECHNICAL FIELD OF THE INVENTION

This invention relates in general to field of electronic systems and, more particularly, to an improved dynamic escrow type detection system.

BACKGROUND OF THE INVENTION

An escrow is an electromechanical device used to collect or return coins deposited in a pay telephone. The escrow consists of an electrical coil wound around a core implementing an electromechanical solenoid. Several different types of escrow mechanisms exist which require different operating voltages, typically either 48 volts DC or 12 volts DC.

The current state of the art requires either (a) predetermination of escrow coil types or (b) driving all escrow types at a common drive level which suffices for the most power demanding of escrow coil types.

The disadvantage of approach (a) is a lack of flexibility in handling multiple types. In a maintenance environment, multiple escrow types may be used in servicing pay telephones. If a phone is serviced by replacing the escrow unit with a different type, the phone must be reprogrammed in some way to recognize the new escrow type. In a sales environment, when phone electronic kits are sold for retrofitting into existing phone housings, the installer must specify to the phone electronics what type of escrow unit is attached by reprogramming the telephone indicating the escrow type to expect or by use of a mechanical device such as a switch to indicate to the operating program the escrow type to expect which also adds cost.

The disadvantage of approach (b) is a life cycle impairment of low voltage escrow units being driven at high energy levels. This reduces the life of mechanical components by excessive wear caused by hard slapping of mechanical arms.

SUMMARY OF THE INVENTION

In accordance with the teachings of the present invention, a dynamic escrow type detection system is provided that substantially eliminates or reduces problems associated with prior systems and methods of operation.

According to one embodiment of the present invention, a mechanism for determining escrow type dynamically is provided that adjusts needed drive energy at the run time of the operating program. This conserves power in low power applications such as telephones that receive their power solely from the telephone line. This capability also increases the life of escrow mechanisms by preventing over drive of escrow coils. An electrical energy storage device can be switched to discharge its energy into the escrow unit. When this is done, the escrow unit is activated. In addition, the characteristics of the discharge process can be monitored and used to determine the escrow type being driven. By empirically characterizing various escrow types driven with a known energy storage device and switch, characterization data can be stored by the operating program for dynamically determining the escrow type.

BRIEF DESCRIPTION OF THE DRAWINGS

A more complete understanding of the present invention and the advantages thereof may be acquired by referring to the accompanying FIGURE wherein:

The drawing is a block diagram of an escrow management system constructed according to the teachings of the present invention.

DETAILED DESCRIPTION OF THE INVENTION

Figure 1:
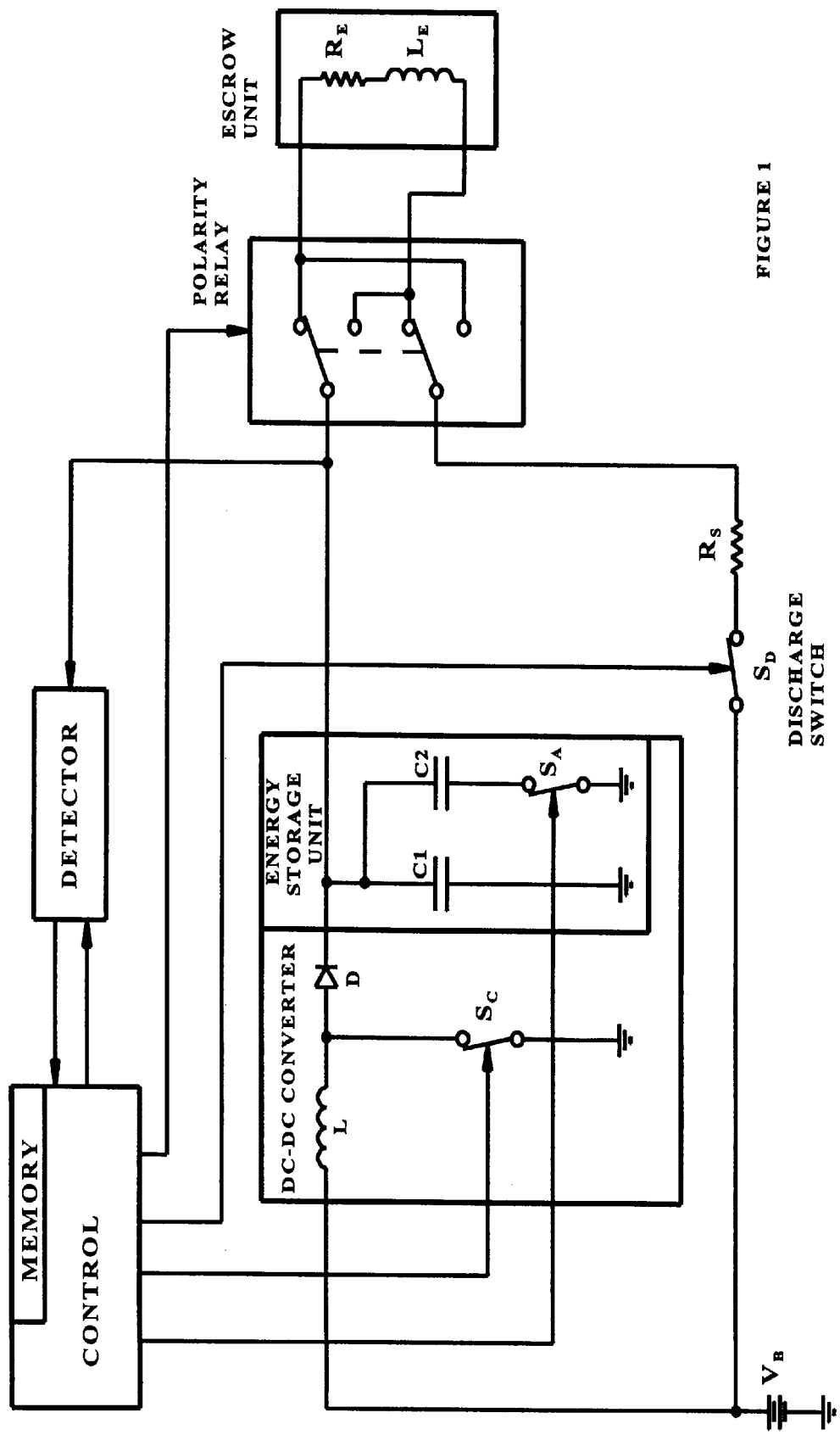

The present invention provides a mechanism for dynamically, at the run time of an operating program, determining the type of escrow unit attached to a pay telephone and using that determination to adjust needed drive or activation energy for the attached escrow unit. This conserves power in low power applications such as line powered telephones and increases life of escrow mechanisms by preventing over drive of escrow coils.

The drawing is a schematic diagram of an escrow management system 10 constructed according to the teachings of the present invention. In part, the drawing represents a low to high voltage DC to DC converter unit 11. Converter unit 11 consists of an inductor 12, diode 14, and converter switch 16 arranged in a fly-back arrangement being driven at a fixed frequency and duty cycle. Inductor 12 may comprise, for example, on the order of 270 $\mu$H of inductance. The charge cycle consists of converter switch 16 connecting a low voltage DC source 18 to inductor 12. Low voltage DC source 18 may comprise, for example, a two-cell lead acid four volt battery. When this is done, the current in inductor 12 increases exponentially. The total energy stored in inductor 12 is indicated by the maximum electrical current reached and is a function of the time converter switch 16 is on. After inductor 12 is charged for a predetermined time cycle, converter switch 16 is turned off disconnecting low voltage DC source 18 from inductor 12. This changes the current in inductor 12 quickly. Inductor 12 has inductance L and current through inductor 12 is i. The voltage across an inductor is given by the expression:

$$v(t)=L*di(t)/dt$$

which indicates that the voltage across an inductor is proportional to how quickly the current changes. As the current changes quickly the voltage across the inductor changes polarity and increases significantly thus the fly-back term. The current in inductor 12 is discharged into an energy storage unit 20 comprising capacitor 22 and capacitor 24 for a fixed time interval, by way of diode 14, which acts as a switch. Capacitors 22 and 24 may each comprise, for example, on the order of 220$\mu$F of capacitance. Diode 14 may comprise, for example, a suitably rated Schottky diode. The above charge and discharge cycle of inductor 12 continues as an increasingly large voltage develops in capacitors 22 and 24. The energy stored in capacitors 22 and 24 is indicated by the current voltage across capacitors 22 and 24. By measuring the voltage on capacitors 22 and 24, the operating program can determine when there is sufficient energy stored for activating an escrow unit 26 of a given type and stop the above charge-discharge cycle.

An energy storage switch 28 is used to select whether both capacitors 22 and 24 are used to store voltage or only capacitor 22 is used. Both capacitors 22 and 24 are used when a lower voltage and higher current is needed to fire a particular escrow unit. Alternatively, energy storage switch 28 is left open and only capacitor 22 is used when a higher voltage and lower current is needed to fire a particular escrow unit.

After sufficient energy is stored in capacitors 22 and 24 to activate a given escrow unit type, a discharge switch 30, is turned on connecting capacitors 22 and 24 to an escrow unit solenoid resistor 32 and an escrow unit solenoid inductor 34 through a polarity switch 36. Polarity switch 36 controls the polarity of the signal sent to escrow unit 26 to either collect or return coins controlled by escrow unit 26 and may comprise, for example, a suitable double pole, double throw relay. Collected coins go into a coinbox within the pay telephone, and returned coins go into a coin return chute within the pay telephone. Discharge resistor 38 is the series resistance of discharge switch 30. Discharge resistor 38 may comprise, for example, on the order of 30Ω of resistance. As capacitors 22 and 24 discharge their energy into escrow unit 26, the voltage on capacitors 22 and 24 and the discharge curve of attached escrow unit 26 can be monitored and used for determining the current escrow unit type attached to escrow management system 10.

Converter switch 16, energy storage switch 28, discharge switch 30, and polarity switch 36 are controlled by a control unit 40 that runs the operating program of the unit. Control unit 40 may comprise, for example, a Motorola 68340 microcontroller with suitable operating memory. Control unit 40 is also used to control a detector unit 42 that is used to track the voltage on capacitors 22 and 24 in order to sense the amount of energy stored on the capacitors and to monitor and characterize the discharge profile for an attached escrow unit 26. This arrangement provides the system of the present invention the ability to dynamically detect an escrow unit type attached to escrow management system 10 and accordingly adjust the firing energy stored in capacitors 22 and 24 of energy storage unit 20.

Thus, the present invention provides a mechanism for dynamically, at the run time of an operating program, determining the escrow unit type attached to an escrow management system and using this determination to adjust the needed drive or activation energy for the attached escrow unit. This conserves power in low power applications such as line powered telephones and increases the life of escrow mechanisms by preventing over drive of escrow coils. This is accomplished by characterizing the discharge curves of known escrow units used with known phone electronics.

The discharge curve characteristics are dependent on the components in the discharge circuit consisting of capacitors 22 and 24 which store the escrow activation energy, discharge switch 30 having resistance $R_S$, escrow unit solenoid resistor 32 having resistance $R_E$, and escrow unit solenoid inductor 34 having inductance $L_E$. The mechanical force of escrow unit 26 resisting activation along with the series resistance of the escrow coil causes the escrow coil impedance to look highly resistive. This effect causes the discharge curve of a given escrow unit to be largely RC in nature. The expression of an RC discharge curve is given by $V_1 = V_0 * e^{-t/RC}$ where $1/RC$ is the time constant of the discharge curve represented by σ.

For a known discharge circuit, the time constant σ can be easily measured in conjunction with each known escrow unit type. These measurements produce a set of empirically derived time constants a for each escrow unit type. If sufficient spread exists in σ for each known escrow unit type, then a can be measured dynamically and used to indicate the escrow unit type attached.

To predetermine the time constant σ for each escrow unit type, the discharge curve is plotted on a graph with respect to time. Two voltage points $V_0$ and $V_1$ along the discharge curve are selected and the time between $V_0$ and $V_1$ is designated as T. The time constant for a given escrow unit type is then determined by σ=−ln$(V_1/V_0)$/T. Below is a list of time constants for three common escrow units used in conjunction with the Astiratel 2 phone electronics board RTC4-05 manufactured and sold by Intellicall.

| Short Circuit | $\sigma_{sh} = 32.1$ |
|---|---|
| 12 V Escrow | $\sigma_{12a} = 20.4$ |
| 12 V Intellicall Escrow | $\sigma_{12} = 16.2$ |
| 48 V Escrow | $\sigma_{48} = 1.85$ |
| Open Circuit | $\sigma_{op} = 0.185$ |

Given these values, only three thresholds need to be determined for judging dynamically if the escrow unit is shorted, if it is a 12 volt escrow or a 48 volt escrow, or if the escrow circuit is open. These thresholds $\sigma_1$, $\sigma_2$, and $\sigma_3$ are derived by taking the geometric mean of adjacent time constants.

$$\sigma_1 = \sqrt{(\sigma_{sh} * \sigma_{12})}$$
$$\sigma_2 = \sqrt{(\sigma_{12} * \sigma_{48})}$$
$$\sigma_3 = \sqrt{(\sigma_{48} * \sigma_{op})}$$

At run time of the operating program, when escrow unit 26 activation takes place or escrow unit 26 is fired, two voltage points $V_0$ followed by $V_1$ are measured on the discharge curve spaced 50 milliseconds apart. This measurement is accomplished by detector unit 42 under the control of control unit 40 and involves the sampling of the voltage on the top plates of capacitors 22 and 24. The ratio of $V_1$ to $V_0$ then indicates the time constant σ for the particular attached escrow unit and is calculated as σ=−ln$(V_1/V_0)$/50msecs.

To determine the attached escrow unit type, the calculated time constant is compared by control unit 40 against the three pre-calculated thresholds as shown below:

if (σ>$\sigma_1$) then Escrow Unit is Short Circuited else
if (σ>$\sigma_2$) then Escrow Unit is 12V else
if (σ>$\sigma_3$) then Escrow Unit is 48V else
Escrow Unit is Open Circuited Given the above determinations, the energy stored in capacitors 22 and 24 is limited to the needed activation energy for the firing of escrow unit 26 attached to escrow management system 10.

The return path from escrow unit 26 is connected through the discharge resistor 38 and discharge switch 30 to the positive pole of low voltage DC source 18 in order to return unused energy to the battery.

Accordingly, a system is provided that can dynamically (at run time of an operating program) determine the escrow unit type attached to a phone electronics board. In addition, the system of the present invention can dynamically determine the failure of an escrow unit exhibiting a short circuit condition, an open circuit condition or non-attachment to the phone electronics board. The system of the present invention also allows for the determination and control of the minimum needed activation energy of an attached escrow unit and allows for the provision of high voltage activation on an as needed basis for escrow unit drive from a low voltage source.

Although the present invention has been described in detail, it should be understood that various changes substitutions and alterations may be made to the systems disclosed herein without departing from the spirit and scope of the invention.

What is claimed is:

1. An escrow management system for use in controlling a pay telephone escrow unit, comprising:

an energy storage unit operable to store a voltage for use in activating an escrow unit coupled to the escrow management system;

a detector operable to determine the voltage requirement of the escrow unit by sensing characteristics of the escrow unit related to the impedance of the escrow unit; and a control unit operable to control the energy storage unit and detector such that the escrow management system can dynamically sense the voltage required to activate the escrow unit coupled to the escrow management system and supply the correct voltage for activation of the escrow unit.

2. The escrow management system of claim 1, wherein the detector senses the characteristics of the escrow unit by monitoring the discharge curve of the energy storage unit which is discharged in response to activation of the escrow unit.

3. The escrow management system of claim 2, wherein the detector monitors the discharge curve by taking a plurality of samples of the remaining voltage in the energy storage unit at different time intervals and storing the samples for use in calculating a time constant for a discharge curve.

4. The escrow management system of claim 3, wherein the control unit calculates a time constant for a discharge curve based on the stored voltage samples.

5. The escrow management system of claim 4, wherein the control unit determines the voltage required to activate the escrow unit by comparing the calculated time constant for the escrow unit coupled to the escrow management system to time constants for a plurality of different escrow units.

6. The escrow management system of claim 1, wherein the control unit is operable to store information indicating the voltage requirement of the escrow unit connected to the escrow management system for use in supplying the correct voltage to the escrow unit.

7. The escrow management system of claim 1, further comprising a polarity switch coupled to the escrow unit operable to reverse the polarity of the voltage supplied to the escrow unit by the energy storage unit.

8. The escrow management system of claim 1, wherein the control unit is operable to set the polarity of the polarity switch.

9. The escrow management system of claim 1, wherein the energy storage unit further comprises a converter unit operable to convert electrical energy to a voltage determined by the control unit for use in charging the energy storage unit.

10. The escrow management system of claim 1, further comprising a DC power source coupled to the escrow management system.

11. The escrow management system of claim 1, further comprising circuitry operable to return unused voltage in the energy storage unit to the DC power source.

12. The escrow management system of claim 1, further comprising an escrow unit coupled to the escrow management system.

13. The escrow management system of claim 1, further comprising circuitry operable to determine failure of the escrow unit based on an open circuit, a closed circuit, or non-attachment of the escrow unit to the escrow management system.

14. An escrow management system for use in controlling a pay telephone escrow unit, comprising:

an escrow unit coupled to the escrow management system;

a polarity switch coupled to the escrow unit and operable to control the directional operation of the escrow unit;

an energy storage unit operable to store a voltage for use in activating the escrow unit coupled to the escrow management system;

a DC power source coupled to the escrow management system;

a convertor unit coupled to the energy storage unit and operable to electrically charge the energy storage unit utilizing energy from the DC power source;

a detector operable to determine the voltage requirement of the escrow unit by taking a plurality of samples of the remaining voltage in the energy storage unit at different time intervals and storing the samples for use in calculating a time constant for a discharge curve;

a control unit operable to calculate the time constant in order to dynamically sense and store the voltage requirement of the escrow unit and further operable to supply the proper voltage to the escrow unit and to determine the setting of the polarity switch.

15. A method for determining a voltage requirement of an escrow unit attached to a pay telephone, comprising:

electrically charging an energy storage unit to a voltage level set by a control unit;

discharging the energy storage unit in response to a command issued by the control unit to activate an escrow unit;

sensing characteristics of the escrow unit related to the impedance of the escrow unit; and determining the voltage requirement of the escrow unit based upon the characteristics of the escrow unit.

16. The method of claim 15, wherein the step of sensing characteristics of the escrow unit comprises monitoring a discharge curve of the energy storage unit.

17. The method of claim 16, wherein the step of monitoring the discharge curve comprises taking a plurality of samples of the remaining voltage in the energy storage unit at different time intervals and storing the samples for use in calculating a time constant for a discharge curve.

18. The method of claim 17, further comprising calculating a time constant for a discharge curve based on stored samples of the remaining voltage in the energy storage unit.

19. The method of claim 18, further comprising comparing the calculated time constant to time constants for a plurality of different escrow units to determine the voltage requirement of the escrow unit coupled to an escrow management system.

20. The method of claim 15, further comprising storing the voltage requirement for the escrow unit coupled to the escrow management system for use in activation of the escrow unit.

21. The method of claim 15, wherein the electrical energy is supplied by a DC power source.

22. The method of claim 15, further comprising returning the voltage remaining in the energy storage unit to the DC power source.

23. A telephone, comprising:

an escrow unit operable to direct coins to either a coin box or a coin return chute;

an escrow management system for use in controlling the escrow unit, comprising:

an energy storage unit operable to store a voltage for use in activating an escrow unit coupled to the escrow management system;

a detector operable to determine the voltage requirement of the escrow unit by sensing characteristics of the escrow unit related to the impedance of the escrow unit; and a control unit operable to control the energy storage unit and detector such that the escrow management system can dynamically sense the voltage required to activate the escrow unit coupled to the escrow management system and supply the correct voltage for activation of the escrow unit.

* * * * *